July 25, 1944. L. S. LONGENECKER 2,354,324
REGENERATIVE FURNACE AND METHOD OF BURNING LIQUID FUEL THEREIN
Filed June 18, 1941 2 Sheets-Sheet 1
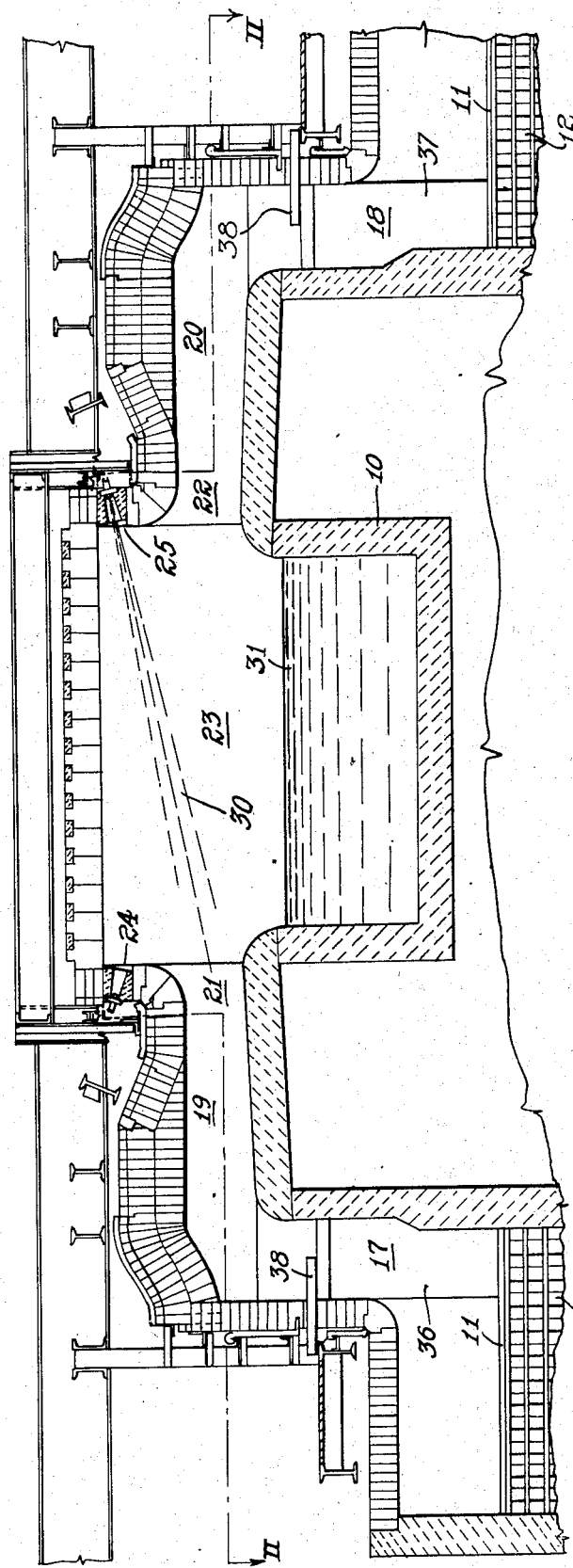
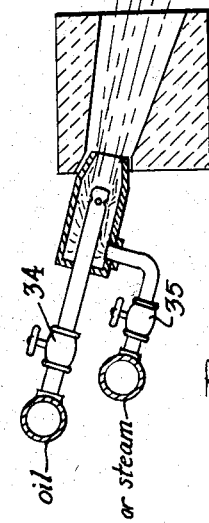
INVENTOR.
Levi S. Longenecker
By Green & McCallister
His Attorneys

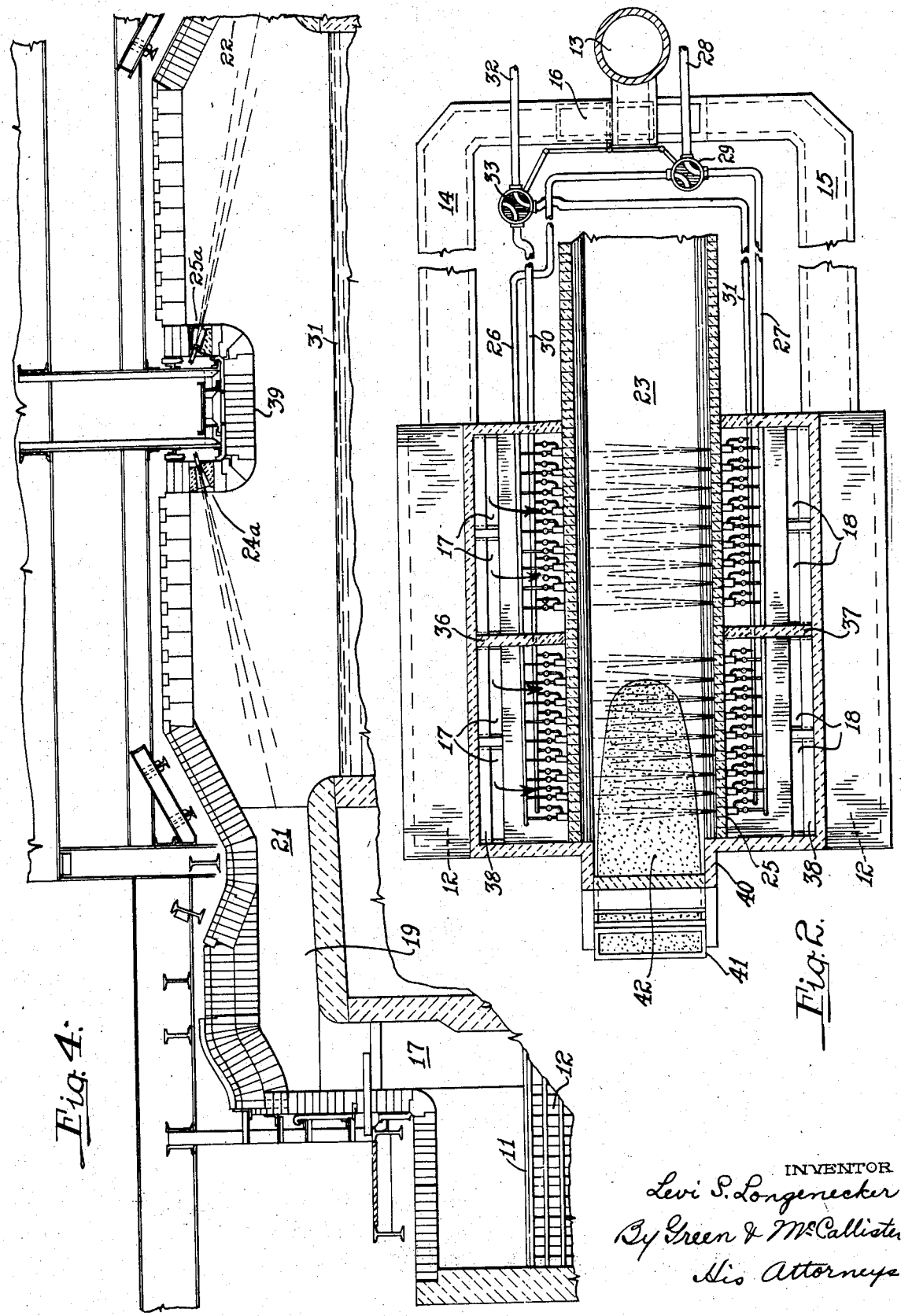

Patented July 25, 1944

2,354,324

UNITED STATES PATENT OFFICE 2,354,324

REGENERATIVE FURNACE AND METHOD OF BURNING LIQUID FUEL THEREIN

Levi S. Longenecker, Mount Lebanon, Pa.

Application June 18, 1941, Serial No. 398,553

8 Claims. (Cl. 263—15)

This invention relates to melting and heating furnaces and more particularly to furnaces having ports which serve as incoming ports for preheated air, and, when the furnace cycle is reversed, as outgoing ports for the hot products of combustion; to a method of burning liquid fuel in such a furnace and to a method of melting and refining glass.

The use of oil as fuel in glass melting furnaces introduces a number of problems which are not present when gas, either natural or producer, is used as fuel.

Many attempts have been made to solve these problems and provide a satisfactory method of burning oil in tank type glass melting furnaces, but so far as I am aware, none of these attempts has been entirely satisfactory.

One object of this invention is to provide an improved method of burning liquid fuel in a regenerative tank type glass melting furnace.

Another object is to produce a regenerative tank type glass melting furnace in which light as well as heavy oils may be efficiently and successfully burned.

A further object is to provide a method of so burning oil in a tank type glass melting furnace that the molten glass bath and batch material within the furnace tank is uniformly heated throughout the full width of the tank.

A still further object is to provide a method of burning liquid fuel in a regenerative tank type glass melting furnace in such manner as to avoid cold spots or excessively hot spots in the glass bath immediately adjacent the ports serving as incoming air ports.

Another object is to provide a method of so burning oil in a regenerative tank type glass melting furnace as to obtain a substantially uniform temperature in the glass bath from one side of the tank to the other.

These and other objects which will be apparent to those skilled in this particular art, I attain by the method and means described in the specification and illustrated in the drawings accompanying and forming part of this application.

In the drawings:

Figure 1 is a transverse sectional view of a regenerative tank type glass melting furnace having a narrow tank, and which is constructed and arranged for the carrying out of the method of this invention.

Fig. 2 is a more or less diagrammatic longitudinal section in plan and is taken on line II—II of Fig. 1, but on a reduced scale.

Fig. 3 is a fragmentary view partially in section and partially in elevation looking toward one side of the furnace heating chamber and illustrates the position and arrangement of the fuel ejectors or jet devices with relation to the ports which serve alternately as incoming ports for the preheated air and outgoing ports for the hot products of combustion.

Fig. 4 is a view similar to Fig. 1, but shows a wide tank furnace constructed and arranged for carrying out the method of this invention, and Fig. 5 is a more or less diagrammatic view of one of the jet projecting devices.

In carrying out my method of burning fuel in a regenerative tank type glass melting furnace in which preheated air is introduced alternately through ports in opposite sides of the furnace heating chamber immediately above the level of the molten glass bath, I project jets of atomized liquid fuel across a substantial part of the furnace heating chamber in a direction substantially opposite to the direction of travel of the preheated air stream, and cause such jets of atomized liquid fuel, or a substantial part of each such jets, to meet and enter the incoming preheated air stream at or near the mouth of the port then serving as the incoming air port. Intermixing of fuel and preheated air thus takes place at the mouth of this port and provides a turbulent flame mass in close proximity to the molten bath immediately adjacent the mouth of such port.

The flame mass is carried with and sustained by the preheated air stream as it travels from the incoming air port to the outgoing port on the opposite side of the furnace heating chamber and thus forms a flame blanket which extends from side to side of the tank in close proximity to the molten bath therein.

In a narrow furnace having a tank—which is not over about eight feet in width—I preferably locate the fuel jet projecting devices or ejectors in a horizontal line immediately above the air ports, and I arrange these ejectors so that the jets of atomized oil or other liquid fuel, or the major part of each such jet projected therefrom, pass across the furnace heating chamber and meet and penetrate, or mix with the incoming air stream at the mouth of the incoming air port.

The ejectors are connected to sources of supply of liquid fuel (light or heavy oil) and air or steam under pressure. Valves in the fuel, and air or steam lines, are so arranged as to operate in synchronism with the usual reversing valve which controls the connections between the stack and checker chambers of the regenerators. The valves open the fuel and air or steam supply lines to the fuel ejectors above the port which is then serving as the outgoing port for the hot products of combustion and close those over the incoming air port.

The jets of atomized liquid fuel are thus caused to travel across the furnace heating chamber before ignition of the main portion thereof takes place. This occurs as it encounters the preheated air stream at the mouth of the incoming air port. By this time the velocity energy of the fuel jets is practically spent, and because of this, I am able to use a fuel jet velocity of from 200-250 feet per second. I am able to use relatively high pressure air or steam for atomizing the oil, and a type of injector which is not susceptible to clogging, and therefore one which requires but a minimum of service. Fine strainers can be dispensed with even Bunker "C" oil.

The fuel jets are projected across the furnace heating chamber through the hot atmosphere above the flame blanket, and, during their travel, the outer portion of each jet feathers off. This in effect is a scrubbing action which causes the outer or feathered off portion of each fuel jet to burn in the hot atmosphere above the flame blanket. This feathering off appears to be progressive since it seems to occur throughout the travel of the fuel jets from the ejectors to the point at which the center core of each jet, which is composed of the heavier particles of atomized oil, reaches the preheated air stream at the mouth of the incoming air port.

The fuel jets during their travel across the furnace heating chamber lose much of their velocity energy thus reducing the tendency to splash as they meet the incoming preheated air stream at the mouth of the incoming air port where forced intermixing of the atomized fuel and preheated air occurs.

I find that I can control the percent of fuel which constitutes the core, and that which feathers or rubs off, by controlling the velocity of the jets and the character of atomization.

It will be seen that I provide a progressive method of burning liquid fuel which automatically takes care of the various sizes of oil particles making up each atomized fuel jet, so that the fuel is completely burned in the furnace chamber without creating excessive hot spots.

The core of each jet, which is made up of the larger particles of oil, reaches the incoming air stream immediately in front of the mouth of the incoming air port. At this point, the velocity energy of the fuel jets has been so reduced that their direction of travel is readily reversed by the air stream so that the atomized liquid fuel is then carried with the air stream across the furnace chamber toward the outgoing port.

This causes a progressive burning of the liquid fuel, first the burning of that which feathers off from the jet as it travels across the furnace chamber above and counter to the incoming air stream, and second, that which burns during the reverse travel of the fuel with the air stream. This insures complete combustion of the various sizes of oil particles within the furnace chamber, and provides a flame blanket of more or less uniform temperature.

Since the oil jets travel across the furnace heating chamber above the flame blanket the likelihood of any unburned oil reaching the surface of the molten glass bath below the flame blanket is remote.

When my method of burning oil is employed in furnaces in which the heating chamber is more than about eight feet in width, I arrange the fuel jet projecting devices or injectors in two juxtaposed horizontal rows on opposite sides of a roof knuckle which extends along the longitudinal center line of the furnace, and projects downwardly below the main level of the furnace roof. These ejectors are also connected to the oil supply, and to the air or steam lines. The supply of oil and air or steam to the two rows is controlled, as above described, by valves which operate in synchronism with the usual reversing valve.

The two rows of ejectors are arranged to act alternately in projecting jets of atomized oil across substantially half the width of the furnace heating chamber, or from said knuckle to the mouth of the port which is then serving as the incoming port for preheated air.

In Fig. 1 of the drawings, I show a regenerative glass melting furnace having a narrow tank 10 (not over about eight feet in width) constructed and arranged for the carrying out of the method of this invention.

Extending along opposite sides of the melting and refining zones of the furnace tank are the regenerative chambers and each such chamber is divided into upper and lower compartments by a horizontal partition 11, with the checkerwork 12 located below said partition.

One end of each checker chamber connects with the stack 13 (Fig. 2) by means of passages 14 and 15, and the usual reversing valve 16 is employed at the junction of said passages and stack.

The regenerator uptakes 17 and 18, by means of substantially horizontal channels 19 and 20, connect with elongated ports 21 and 22 located on opposite sides of the furnace heating chamber 23. The length of each of these ports is preferably substantially equal to that of the adjacent zone of the furnace tank as disclosed in an application filed by me on June 29, 1940, and which is serially numbered 343,188. In other words, ports 21 and 22, on opposite sides of the melting zone, are substantially equal in length to the length of that zone, and ports 21 and 22 on opposite sides of the refining zone are substantially equal to the length of the refining zone.

Ports 21 and 22 on opposite sides of the melting and refining zones, as in the majority of tank type glass melting regenerative furnaces, are arranged to alternately serve as incoming ports for the hot products of combustion. Reversal of the cycle of operation is accomplished by reversing valve 16 in the usual manner.

While my method of burning oil can be practiced in regenerative tank type glass melting furnaces having sprung roofs, and a series of relatively short ports on opposite sides of the furnace heating chamber, I prefer furnaces having flat suspended roofs and relatively long ports, and in the drawings I have illustrated furnaces having relatively long ports and which are equipped for the carrying out of my method.

In a furnace of narrow width such as is illustrated in Figs. 1 and 2 of the drawings, the liquid fuel jet projecting devices or ejectors are preferably located above the knuckles forming the roofs of ports 21 and 22. The jet devices above port 21 are numbered 24 while those above port 22 are numbered 25. One of these jet projecting devices is more or less diagrammatically illustrated in Fig. 5 of the drawings. They may be of any desired type capable of being operated by air or steam under relatively high pressures, and of handling light oils, or heavy oils such as Bunker "C."

The oil under pressure is conveyed to the jet devices by means of pipes 26 and 27, and these pipes are connected to a source of supply of such oil under pressure by means of a pipe 28. A valve 29, which is arranged to operate in synchronism with reversing valve 16, controls the delivery of oil or other liquid fuel to one or the other of pipes 26 and 27, depending upon which of the preheated air ports is then serving as the incoming port.

Air or steam under relatively high pressure is supplied to the jet projecting devices by means of pipes 30 and 31 which are connected to a source of supply of compressed air or high pressure steam by means of a pipe 32. A valve 33, which is also arranged to operate in synchronism with reversing valve 16, controls the delivery to one or the other of pipes 30 or 31, depending upon which series of jet projecting devices is to be operated. Each jet projecting device has its oil regulating valve 34, and its air or steam regulating valve 35.

During the time ports 21 are serving as incoming ports for the preheated air streams, jet projecting devices 25 function to project jets of atomized liquid fuel into each of the air streams issuing from ports 21. When reversing valve 16, and therefore valves 29 and 33, are operated to reverse the firing, or in other words to reverse the cycle, ports 22 then serve as incoming ports for the preheated air, and jet projecting devices 24 then function to project jets of atomized liquid fuel across the furnace heating chamber into the incoming air streams as they issue from ports 22.

While the fuel jets penetrate the preheated air streams immediately in front of the incoming air ports, the velocity energy of such jets is by that time reduced to a point where it is but slightly greater than that of the preheated air streams.

The heavier or larger particles of liquid fuel forming the core of each jet 30 penetrate the preheated air streams at the mouth of the incoming air ports, thus creating a turbulent mass of burning gas immediately adjacent these ports and close to the surface of the molten glass bath 31.

Each of the regenerator uptakes 17 and 18 as well as horizontal channels 19 and 20 is provided with a vertically extending wall which in effect divides the same into two uptakes. One of the partitions for uptake 17 is numbered 36 and one for uptake 18 is numbered 37. These uptakes and horizontal channels connect with the preheated air ports. Each division of each uptake is provided with an adjustable damper 38 as disclosed in an application filed by me and which is serially numbered 343,186. These dampers permit independent regulation of different parts of the preheated air streams delivered to the melting and refining zones of the furnace.

In furnaces having wide tanks and flat suspended roofs as disclosed in Fig. 4, I provide a suspended knuckle 39 which extends along the center line of the furnace heating chamber throughout the melting and refining zones in a manner somewhat similar to that disclosed in my said application 343,186.

In wide furnaces, instead of locating the liquid fuel ejectors above the furnace ports, I locate the same on opposite sides of knuckle 39 as shown at 24a and 25a, Fig. 4. Ejectors 25a are arranged so as to project jets of atomized liquid fuel to the mouth of ports 22, while ejectors 24a are arranged to project their jets of atomized liquid fuel to the mouth of ports 21.

These ejectors are coupled up to liquid fuel supply pipes similar to pipes 26 and 27, and the flow of liquid fuel and compressed air or steam is controlled by valves similar to valves 29 and 33, which valves are also operated in synchronism with reversing valve 16.

The granular glass making materials are preferably fed onto the exposed surface of the molten bath within a tank extension 40. This extension is of substantially the full width of the tank 10 and is located at its material receiving end.

The feeding means 41 for the granular glass making material is preferably such that the granular batch or glass making material is deposited in the form of a relatively thin layer or blanket 42, which, beginning adjacent the outer wall of the tank extension extends into the tank proper (as shown in Fig. 2) where it is progressively melted.

The particles of oil or other liquid fuel forming the jets, in traveling across the furnace heating chamber in narrow tank furnaces, and from the center knuckle to the incoming air ports in wide tank furnaces, become preheated by the hot furnace atmosphere above the flame blanket.

In both narrow and wide tank furnaces, the atomized fuel and preheated air travel in substantially opposite directions, and forced intermixing thereof takes place immediately adjacent the incoming air ports. This creates a turbulent flame mass which, beginning at the incoming air ports, travels with the preheated air streams across the full width of the furnace chamber in the form of a flame blanket.

It is apparent that the width of knuckle 39 may be varied in order to vary the distance from the fuel ejectors to the air ports then serving as incoming ports for the preheated air streams.

It will be obvious that one or a multiple of ejectors per preheated air port may be used. Multiple ejectors, however, are more desirable since by their use, better intermixing of atomized liquid fuel and preheated air, adjacent the incoming air ports, is obtained. By projecting liquid fuel in jet form across a substantial portion of the furnace heating chamber, and in a direction substantially opposite, or counter, to the direction of travel of the incoming preheated air streams, I am able to obtain complete combustion of the liquid fuel within the furnace chamber.

This method of introducing liquid fuel, such as oil, in firing glass melting furnaces spreads out the flame more uniformly over the complete surface of the bath of molten glass and eliminates local hot spots which have heretofore been one of the most objectionable features resulting from the use of heavy oil or other liquid fuel in such furnaces.

Having thus described my invention, what I claim as new and desire to secure by Letters Patent is:

1. In a glass melting furnace having a flat roof and ports on opposite sides of the furnace chamber which alternately serve as incoming ports for preheated air streams and outgoing ports for waste gases, a longitudinally extending knuckle located centrally of the furnace chamber below the roof line, devices located on opposite sides of said knuckle for projecting jets of liquid fuel in opposite directions toward said air ports, means for reversing the flow of preheated air through said ports, and means for so controlling the delivery of liquid fuel to said jet projecting devices that only those discharging toward the ports serving as incoming air ports are operative during operation of the furnace.

2. A method of heating a batch of material located within a furnace closure and having a substantially flat and substantially horizontal face exposed directly to the sensible heat of combustion within such furnace closure, which consists in causing a well defined stream of heated air to flow across and immediately adjacent to at least a portion of such exposed surface of such batch and within said furnace closure, projecting a jet of fuel into such furnace closure at a point above and spaced from such exposed surface and above such stream of heated air, causing fuel of such jet to move across at least a portion of such exposed surface in a direction opposite to that of such air stream, to merge with such air stream at a point immediately adjacent such exposed surface but remote from the point at which such fuel was delivered into such furnace closure, and then to move while burning with said air stream across and in close proximity to at least a portion of said exposed surface.

3. A method of heating a body of material, such as a glass batch, within a furnace closure, which consists in causing a well defined stream of heated air to pass across and immediately adjacent to at least a portion of the upper surface of such batch, projecting a jet of fuel into such closure at a point above and spaced from the upper surface of such batch and above such air stream, causing fuel of such jet to move in a direction opposite to that of such air stream across at least a portion of the upper surface of such batch, to enter such air stream while so moving and at a point adjacent the upper surface of such batch but remote from the point at which such fuel was delivered into such furnace closure, and then to move with such air stream across and in close proximity to at least a portion of such exposed surface.

4. A method of heating a body of material, such as a glass batch, within a furnace closure, which consists in directing a well defined stream of heated air across and in contact with at least a portion of the upper surface of such batch, projecting a jet of fuel into such closure above the upper surface of such batch and above said air stream, causing fuel of such jet to move substantially counter to such stream across at least a portion of the upper surface of such batch and to first enter such air stream at a point removed from the point of delivery of such fuel into such closure, and then to chemically combine with air of such stream while moving therewith across the upper surface of such batch.

5. In combination with a furnace closure in which substantially horizontally disposed material is to be heated, means for causing a well defined stream of heated air to enter and pass across a substantial part of such closure in contact with the exposed surface of such material, and means for so projecting and directing a jet of fuel through a substantial part of the furnace closure above such air stream and in substantially the opposite direction to such stream, that fuel of such jet merges with such air stream adjacent its incoming side and above such material, has its direction reversed by such stream, and burns as it travel with such stream across and in contact with the material to be heated.

6. In combination with a furnace closure in which a horizontally disposed bath of glass and batch material is to be heated, means for causing a well defined stream of heated air to enter and pass across such closure in contact with such bath and batch material, and means for so projecting and directing a jet of fuel across a substantial part of the furnace closure above such air stream and in substantially the opposite direction to such stream, that fuel of such jet meets and enters the heated air stream adjacent the side at which such stream enters the furnace closure and immediately above such material, ignites, has its direction reversed by such stream and travels with such stream across the furnace closure in contact with the material to be heated.

7. In combination with a furnace closure in which a bath of glass and batch material is to be exposed directly to the sensible heat of combustion within such furnace closure, means for causing a well defined stream of heated air to enter such furnace closure and pass across the same in contact with such bath and batch material, and means for so projecting and directing a jet of fuel into such furnace closure above such air stream and in a direction substantially opposite thereto, that fuel of such jet is caused to travel across such furnace closure, merge with such air stream at a point immediately adjacent such exposed surface and adjacent the point at which the air stream enters such furnace closure, and then while burning in the air of such stream to move in substantially the opposite direction across and in close proximity to said exposed surface.

8. In combination with a furnace closure in which a bath of glass and batch material is to be exposed directly to the sensible heat of combustion within such furnace closure, means for causing a well defined stream of heated air to enter the furnace closure and pass across the same in contact with such bath and batch material, and means for so projecting and directing a jet of fuel into such furnace closure at a point above and spaced from the exposed surface of the bath and batch material and above such stream of heated air that fuel of such jet is caused to move across at least a portion of such furnace closure above such air stream in a direction opposite thereto, to merge with such air stream adjacent its point of entry into such closure and adjacent the exposed surface of the glass and batch material and then to move in substantially the opposite direction across and in close proximity to said exposed surface while burning in such air stream.

LEVI S. LONGENECKER.